May 3, 1949.  P. J. SLATER  2,469,182
PNEUMATIC CLIPPER
Filed March 27, 1946
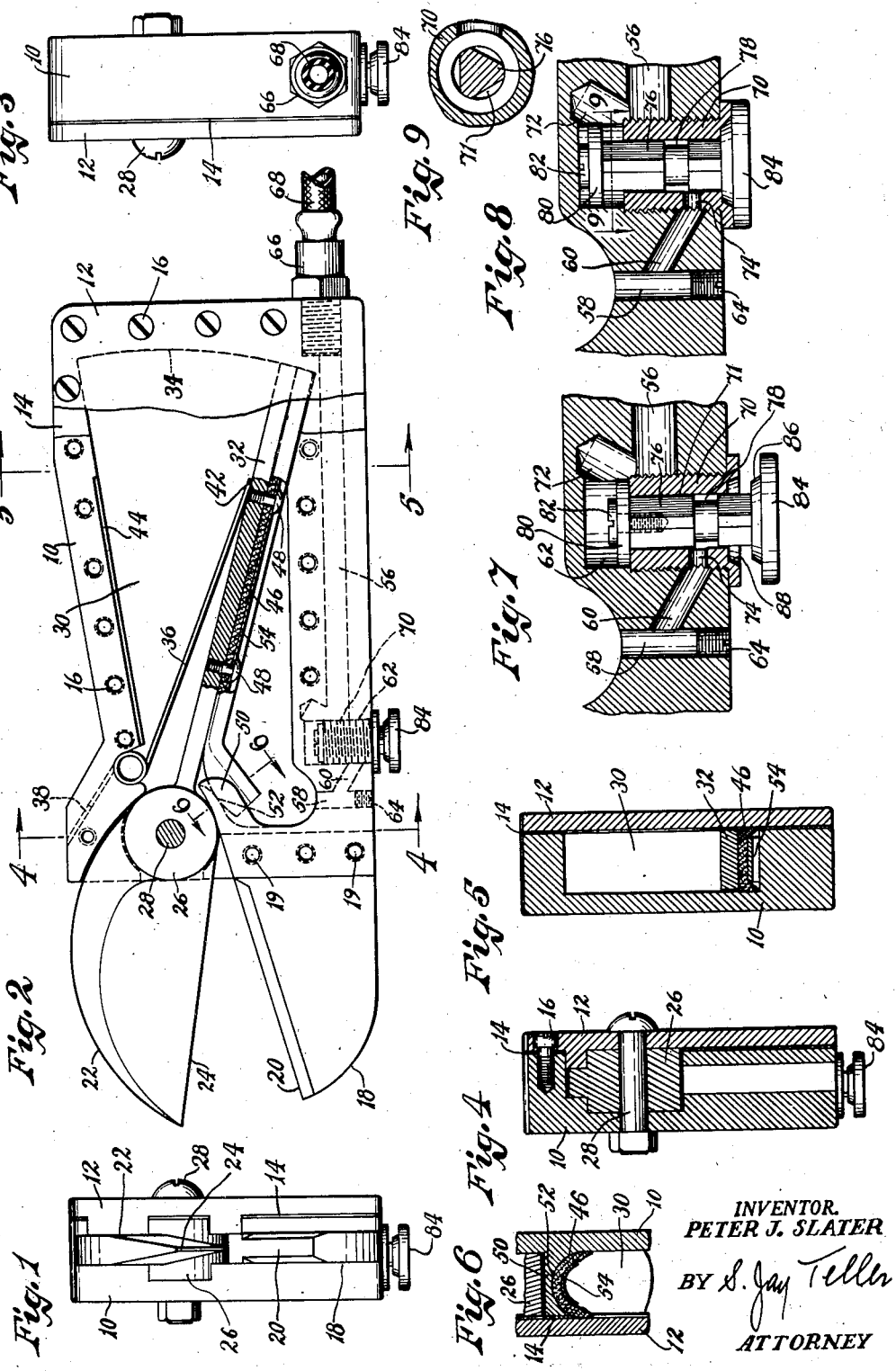
INVENTOR.
PETER J. SLATER
BY S. Jay Teller
ATTORNEY Patented May 3, 1949

2,469,182

UNITED STATES PATENT OFFICE 2,469,182

PNEUMATIC CLIPPER

Peter J. Slater, East Hartford, Conn., assignor to The South Windsor Manufacturing Company, South Windsor, Conn., a corporation of Connecticut Application March 27, 1946, Serial No. 657,504

18 Claims. (Cl. 30—228)

The principal object of the invention is to provide a pneumatic clipper adapted to be conveniently held in one hand of the operator and adapted to be used for trimming shrubs and hedges, or for pruning bushes or trees under circumstances wherein the operator can have direct access to the areas or regions to be trimmed or pruned. The clipper is operated pneumatically under the manual control of the operator.

Further and more specific objects of the invention are to provide various mechanical features and arrangements of parts conducive to the attainment of the above stated more general object.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing,

Fig. 1 is a front end view of a clipper embodying the invention.

Fig. 2 is a side view with a portion of the cover broken away to show interior parts.

Fig. 3 is a rear end view.

Fig. 4 is a transverse sectional view taken along the line 4—4 of Fig. 2.

Fig. 5 is a transverse sectional view taken along the line 5—5 of Fig. 2.

Fig. 6 is a fragmentary transverse sectional view taken along the line 6—6 of Fig. 2.

Fig. 7 is an enlarged fragmentary longitudinal sectional view showing the air passage and the valve, the valve being in closed position.

Fig. 8 is a view similar to Fig. 6 except that the valve is in open position.

Fig. 9 is a fragmentary sectional view taken along the line 9—9 of Fig. 8.

The clipper is shown in the drawing as being in horizontal position, but it is to be understood that the terms "vertical," "horizontal" and the like, are intended to be employed in relative senses, and that the device may be used not only in the horizontal position as shown, but also in any other position.

As shown in the drawing, the clipper comprises a main housing consisting of a body 10 and a side cover 12. Preferably a gasket 14 is interposed between the body and the cover, and the cover is held in place by means of a plurality of screws 16, 16. The housing consisting of the body 10 and the cover 12 is of such size and shape that it can be conveniently grasped by one hand of the operator.

Projecting from the front end of the housing and rigidly connected therewith is an abutment jaw 18 having an upward facing abutment surface 20 which is preferably flat. As shown, the abutment jaw 18 is formed separately from the body 10 and it may be a steel forging fitting a slot in the front of the body and held in place by screws 19, 19. The housing is preferably formed of a light material such as aluminum, and if desired the jaw 18 may be formed integrally with the body 10 of the housing.

A cutting jaw 22, which is preferably a steel forging, is connected with the housing at the front end thereof and is pivotally movable about a transverse axis. The cutting jaw 22 has a cutting edge 24 which is preferably straight and which is in adjacent cooperative relationship with the surface 20 of the abutment jaw 18. The cutting jaw 22 has a hub 26 which is entered in a suitable recess in the body 10 and which is centrally apertured to receive a transverse pivot pin 28. The said pivot pin extends through suitably located apertures in the body 10 and the cover 12.

The body 10 of the housing has a chamber 30 therein having flat parallel side walls, the inner face of the cover 12 constituting one of the walls. A blade 32 is provided which is pivotally movable within the chamber 30 and which has cooperative relationship with the walls thereof. The blade 32 is operatively connected with the pivoted cutting jaw 22 so that movement of the blade causes movement of the jaw. Preferably the blade is rigidly connected with the jaw, being shown as formed integrally therewith, but the invention is not necessarily so limited. The chamber 30 preferably has an arcuate end wall 34 which is concentric with the pivotal axis of the jaw and blade at 28.

The pivoted jaw 22 is operated by admitting air under pressure to the chamber 30 at one side of the blade 32, that is, at the lower side as shown in Fig. 2. The means for admitting and controlling the air will be presently described in detail. A coil spring 36 is carried by the housing within the chamber 30 and one end of the spring extends into a drilled hole 38 in the body, the spring being thus held in place. The other end of the spring engages the blade 32 at 42, and the spring thus serves to bias the blade in the direction opposite to that in which it is moved by air pressure, that is, in the downward direction. The top wall of the chamber 30 is provided with a groove 44 for receiving the end portion of the spring 36 when the blade is in its uppermost position. Sufficient space is provided at the top between the hub 26 and the adjacent portion of the housing to permit air to freely flow out of and into the upper portion of the chamber 30 as the blade 32 is oscillated.

The blade 32 is preferably provided at its lower side with a suitable strip of packing 46 formed of rubber or neoprene, or other suitable material. This is held in place by means of screws 48, 48. This packing has downward turned edges at the sides and at the outer end for engagement with the side walls of the chamber and with the end wall 34 thereof, and it serves to prevent the passage of air upward past the blade. In order to prevent the escape of air from the front end of the lower or pressure portion of the chamber 30, the body 10 is provided with an inward extending transverse ledge 50, and the front end portion of the packing 46 is bent downward so as to engage the lower surface of the ledge. Preferably, in order to avoid flexing of the packing 46 as the blade 32 is moved, the ledge 50 has a surface 52 which is arcuate in longitudinal section and which is concentric with the pivotal axis at 28. The lower surface 52 of the ledge 50 is preferably also arcuate in transverse section and is concave as shown in Fig. 6, in order to avoid any sharp corners at the juncture of the said surface with the side walls of the chamber. In fact the end portions of the surface smoothly join the side walls of the chamber as shown. The left end portion of the packing 46 is shaped to engage and fit the concave shape of the surface 52 as shown. In order to insure firm engagement of the packing 46 with the arcuate and concave surface 52, the packing is preferably provided with a backing strip 54 formed of thin resilient metal, this being held in place by the same screws 48, 48 which hold the packing.

The cutting edge 24 of the jaw 22 preferably is not positioned radially with respect to the pivotal axis at 28, but is offset with respect thereto being tangent to a circle concentric with the said axis. As the jaw 22 moves downward as the result of air pressure applied to the blade 32, the movement of the cutting surface 24 has an inward component, thus providing a drawing or shearing action. This drawing or shearing action serves more effectively to cut twigs or branches, and is much more advantageous than would be the plain chopping action that would result if the cutting edge 24 were exactly radial.

An air passage is formed in the lower part of the housing 10 and this preferably extends in a generally longitudinal direction. As shown, the air passage comprises a longitudinal hole 56, a transverse hole 58, and a connecting hole 60. Interposed between the holes 56 and 60 is a transverse generally cylindrical recess 62 with which the said holes 56 and 60 communicate. The said holes 56, 58 and 60 are preferably formed by drilling, and when so formed the outer end of the hole 58 is closed by a plug 64. At the rear end of the body 10 is a connecting means or coupling 66 which communicates with the hole 56 and is adapted for the attachment of a flexible air hose 68. The hose 68 extends to a compressor or other suitable source of air under pressure, and by means of the hose and the connection 66 air under pressure is admitted to the hole 56.

Located in the recess 62 is a suitable manual operable valve for controlling the passage of air from the hole 56 to the hole 60. As shown, the valve comprises a generally cylindrical body 70 suitably held in place, as for instance by exterior threads thereon engaging interior threads on the walls of the recess 62. Means is provided for permitting the passage of air from the hole 56 to the upper portion of the recess 62, and as shown, this is a drilled hole 72 intersecting beyond the hole 56 and the recess 62. The body 70 has a central aperture 71 therein, and also has a hole 74 extending between the central aperture 71 and the hole 60. Longitudinally movable within the central aperture 71 and guided thereby is a member 76. As shown more clearly in Fig. 9, the member 76 is not circular in cross section, but is provided with flats, or is otherwise shaped, to provide longitudinal air passages between the said member and the walls of the aperture 71. The member 76 is also provided with an annular groove 78, as clearly shown in Figs. 7 and 8. A washer 80 is carried by the member 76 at the upper end thereof, being held in place by a screw 82. When the valve is in closed position, as shown in Fig. 7, the washer 80 is seated on the body 70 and serves to prevent the passage of air through the central opening in the said body. The parts are normally held by air pressure in the positions shown.

At its lower end the member 76 carries an exteriorly located manually engageable button 84, and this button has a beveled surface 86 constituting a valve element adapted to engage a correspondingly beveled valve seat 88 formed in the lower end of the body 70. When the valve is in open position, as shown in Fig. 8, the interior of the blade chamber in the housing is in communication with the external air through the holes 58, 60 and 74, and through the central aperture 71 in the body 70.

In use the clipper is held in one hand of the operator and when the operator desires to move the jaw 22 to effect clipping or pruning, he presses the valve button 84 thus moving the valve from the position shown in Fig. 7 to that shown in Fig. 8. This opens the air passage and permits air to flow from the hole 56 through the central recess 71 in the valve body 70, and through the holes 72, 60 and 58 to the lower portion of the chamber 30. With the valve in this position the valve element 86 engages the seat 88 to prevent the escape of air to the exterior. The air pressure thus admitted to the lower portion of the chamber 30 moves the blade 32 upward and moves the jaw 22 downward to effect clipping or pruning. As soon as clipping or pruning has been effected, the operator releases the button 84 and the valve is then automatically moved by air pressure to the closed position shown in Fig. 7. This establishes communication between the lower portion of the chamber 30 and the exterior atmosphere in the manner already described, and the blade is moved downward to the position shown in Fig. 2 by means of the spring 36. Thus, the operator can control the movement of the cutting jaw 22 at will, and no manual effort is required beyond the mere pressing of the button 84.

What I claim is:

1. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, and means for admitting air under pressure to the chamber at one side of the blade to pivotally move the blade in the direction to pivotally move the cutting jaw toward the abutment jaw.

2. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade rigidly connected with the pivoted cutting jaw and located within the housing chamber, the said blade having cooperative relationship with the walls of the said chamber, and means for admitting air under pressure to the chamber at one side of the blade to pivotally move the blade in the direction to pivotally move the cutting jaw toward the abutment jaw.

3. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, means for admitting air under pressure to the chamber at one side of the blade to pivotally move the blade in the direction to pivotally move the cutting jaw toward the abutment jaw, and a spring connected with the housing and the blade for biasing the blade in the direction opposite to that in which it is moved by air pressure.

4. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, means for admitting air under pressure to the chamber at one side of the blade to pivotally move the blade in the direction to pivotally move the cutting jaw toward the abutment jaw, and packing carried by the blade and engaging the walls of the chamber to prevent the passage of air past the blade.

5. The combination in a pneumatic clipper, of a main housing having a chamber therein with parallel side walls and with an arcuate wall at one end, an abutment jaw rigidly connected with the housing and projecting therefrom at the end opposite the arcuate wall, a cutting jaw pivotally connected with the housing at the last said end thereof and projecting therefrom in adjacent cooperative relationship with the abutment jaw, a blade pivotally movable within the housing chamber and operatively connected with the pivoted cutting jaw, the pivotal axis of the blade being coincident with the axis of the arcuate end wall and the blade having cooperative relationship with the said chamber side walls and arcuate end wall, and means for admitting air under pressure to the chamber at one side of the blade to pivotally move the blade in the direction to pivotally move the cutting jaw toward the abutment jaw.

6. The combination in a pneumatic clipper, of a main housing having a chamber therein with parallel side walls and with an arcuate wall at one end, an abutment jaw rigidly connected with the housing and projecting therefrom at the end opposite the arcuate wall, a cutting jaw pivotally connected with the housing at the last said end thereof and projecting therefrom in adjacent cooperative relationship with the abutment jaw, a blade pivotally movable within the housing chamber and operatively connected with the pivoted cutting jaw, the pivotal axis of the blade being coincident with the axis of the arcuate end wall and the blade closely fitting the said chamber side walls and arcuate end wall, means for admitting air under pressure to the chamber at one side of the blade to pivotally move the blade in the direction to pivotally move the cutting jaw toward the abutment jaw, and packing carried by the blade and engaging the walls of the chamber to prevent the passage of air past the blade.

7. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, means for admitting air under pressure to the chamber at one side of the blade to pivotally move the blade in the direction to pivotally move the cutting jaw toward the abutment jaw, a ledge extending across the chamber adjacent the pivotal axis of the blade and at the pressure side thereof and having an inward facing surface, and a strip of packing carried by the blade at the last said side thereof and having a portion thereof in engagement with the said surface of the ledge to seal the corresponding end of the pressure portion of the chamber.

8. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, means for admitting air under pressure to the chamber at one side of the blade to pivotally move the blade in the direction to pivotally move the cutting jaw toward the abutment jaw, a ledge extending across the chamber adjacent the pivotal axis of the blade and at the pressure side thereof and having an inward facing arcuate surface which in longitudinal section is concentric with the last said pivotal axis, and a strip of packing carried by the blade at the last said side thereof and serving to prevent the passage of air past the blade, the said packing having a portion thereof in engagement with the arcuate surface of the ledge to seal the corresponding end of the pressure portion of the chamber.

9. The combination in a pneumatic clipper, of a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, means for admitting air under pressure to the chamber at one side of the blade to pivotally move the blade in the direction to pivotally move the cutting jaw toward the abutment jaw, a ledge extending across the chamber adjacent the pivotal axis of the blade and at the pressure side thereof and having an inward facing surface, a strip of packing carried by the blade at the last said side thereof and serving to prevent the passage of air past the blade, the said packing having a portion thereof in engagement with the arcuate surface of the ledge to seal the corresponding end of the pressure portion of the chamber, and a spring backing element engaging the packing to resiliently hold it in engagement with the said surface of the ledge.

10. The combination in a pneumatic clipper, of a main housing having a chamber therein with parallel side walls and with an arcuate wall at one end, an abutment jaw rigidly connected with the housing and projecting therefrom at the end opposite the arcuate wall, a cutting jaw pivotally connected with the housing at the last said end thereof and projecting therefrom in adjacent cooperative relationship with the abutment jaw, a blade pivotally movable within the housing chamber and operatively connected with the pivoted cutting jaw, the pivotal axis of the blade being coincident with the axis of the arcuate end wall and the blade having cooperative relationship with the said chamber side walls and arcuate end wall, means for admitting air under pressure to the chamber at one side of the blade to pivotally move the blade in the direction to pivotally move the cutting jaw toward the abutment jaw, a ledge extending across the chamber at the end thereof opposite the arcuate wall and at the pressure side of the blade, the said ledge having an inward facing surface which in transverse section is concave so as to smoothly join the chamber side walls, and a strip of packing carried by the blade at the last said side thereof and having a portion thereof transversely curved to engage and fit the said transversely concave surface of the ledge to seal the corresponding end of the pressure portion of the chamber.

11. The combination in a pneumatic clipper, of a main housing having a chamber therein with parallel side walls and with an arcuate wall at one end, an abutment jaw rigidly connected with the housing and projecting therefrom at the end opposite the arcuate wall, a cutting jaw pivotally connected with the housing at the last said end thereof and projecting therefrom in adjacent cooperative relationship with the abutment jaw, a blade pivotally movable within the housing chamber and operatively connected with the pivoted cutting jaw, the pivotal axis of the blade being coincident with the axis of the arcuate end wall and the blade having cooperative relationship with the said chamber side walls and arcuate end wall, means for admitting air under pressure to the chamber at one side of the blade to pivotally move the blade in the direction to pivotally move the cutting jaw toward the abutment jaw, a ledge extending across the chamber at the end thereof opposite the arcuate wall and at the pressure side of the blade and having an inward facing arcuate surface which in longitudinal section is concentric with the pivotal axis of the blade and which in transverse section is concave so as to smoothly join the chamber side walls, and a strip of packing carried by the blade at the last said side thereof and having a portion thereof transversely curved to engage and fit the transversely concave surface of the ledge to seal the corresponding end of the pressure portion of the chamber.

12. In a pneumatic clipper, the combination of a main housing having a chamber therein, an abutment jaw rigidly connected with the housing and projecting therefrom at one end, the said abutment jaw having an abutment surface, a cutting jaw pivotally connected with the housing and projecting therefrom at the last said end in adjacent cooperative relationship with the abutment jaw, the said cutting jaw having a cutting edge in offset relationship with its pivotal axis and adapted to have line contact with the abutment surface of the abutment jaw, a blade pivotally movable within the housing chamber and operatively connected with the pivoted cutting jaw, the said blade having cooperative relationship with the walls of the said chamber, and means for admitting air under pressure to the chamber at one side of the blade to pivotally move the blade in the direction to pivotally move the cutting jaw toward the abutment jaw.

13. In a pneumatic clipper, the combination of a main housing having a chamber therein, an abutment jaw rigidly connected with the housing and projecting therefrom at one end, the said abutment jaw having an abutment surface, a cutting jaw pivotally connected with the housing and projecting therefrom at the last said end in adjacent cooperative relationship with the abutment jaw, the said cutting jaw having a cutting edge in offset relationship with the pivotal axis and adapted to have line contact with the abutment surface of the abutment jaw, a blade rigidly connected with the pivoted cutting jaw and located within the housing chamber, the said blade having cooperative relationship with the walls of the said chamber, and means for admitting air under pressure to the chamber at one side of the blade to pivotally move the blade in the direction to pivotally move the cutting jaw toward the abutment jaw.

14. In a pneumatic clipper, the combination of a main housing having a chamber therein, an abutment jaw rigidly connected with the housing and projecting therefrom at one end, the said abutment jaw having an abutment surface, a cutting jaw pivotally connected with the housing and projecting therefrom at the last said end in adjacent cooperative relationship with the abutment jaw, the said cutting jaw having a cutting edge in offset relationship with the pivotal axis and adapted to have line contact with the abutment surface of the abutment jaw, a blade pivotally movable within the housing chamber and operatively connected with the pivoted cutting jaw, the said blade having cooperative relationship with the walls of the said chamber, means for admitting air under pressure to the chamber at one side of the blade to pivotally move the blade in the direction to pivotally move the cutting jaw toward the abutment jaw, a ledge extending across the chamber adjacent the pivotal axis of the blade and at the pressure side thereof and having an inward facing arcuate surface which in longitudinal section is concentric with the last said pivotal axis, and a strip of packing carried by the blade at the last said side thereof and having a portion thereof in engagement with the arcuate surface of the ledge to seal the corresponding end of the pressure portion of the chamber.

15. A pneumatic clipper comprising in combination, a main housing having a chamber therein, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, and means including a normally closed manually openable valve for admitting air under pressure to the chamber at one side of the blade to pivotally move the blade in the direction to pivotally move the cutting jaw toward the abutment jaw.

16. A pneumatic clipper comprising in combination, a main housing having a chamber therein and having a longitudinally extending air passage therein communicating at one end with the chamber, means for connecting the other end of the air passage with air pressure means, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, and a normally closed manually openable valve in the air passage for admitting air under pressure to the chamber so as to pivotally move the blade in the direction to pivotally move the cutting jaw toward the abutment jaw.

17. A pneumatic clipper comprising in combination, a main housing having a chamber therein, the said housing having a longitudinally extending air passage therein communicating at one end with the chamber and having a recess extending transversely of and intersecting the air passage and extending to the housing exterior, means for connecting the other end of the air passage with air pressure means, an abutment jaw rigidly connected with the housing and projecting thereform at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, a valve in the transversely extending recess in the housing normally held closed by air pressure, and a manually engageable button at the exterior of the housing and connected with the valve to open it and thus admit air under pressure to the chamber so as to pivotally move the blade in the direction to pivotally move the cutting jaw toward the abutment jaw.

18. A pneumatic clipper comprising in combination, a main housing having a chamber therein, the said housing having a longitudinally extending air passage therein communicating at one end with the chamber and having a recess extending transversely of and intersecting the air passage and extending to the housing exterior, means for connecting the other end of the air passage with air pressure means, an abutment jaw rigidly connected with the housing and projecting therefrom at one end, a cutting jaw pivotally connected with the housing and projecting therefrom at the last said end in adjacent cooperative relationship with the abutment jaw, a blade pivotally movable within the housing chamber and operatively connected with the pivoted cutting jaw, the said blade having cooperative relationship with the walls of the said chamber, a spring for biasing the blade in the direction to move the cutting jaw away from the abutment jaw, a normally closed valve in the transversely extending recess in the housing, the said valve when in closed position permitting air to flow from the chamber to the exterior of the housing and when in open position preventing such flow, and a manually engageable button at the exterior of the housing and connected with the valve to open it and thus admit air under pressure to the chamber so as to pivotally move the blade in the direction to pivotally move the cutting jaw toward the abutment jaw.

PETER J. SLATER.

REFERENCES CITED

The following references are of record in the file of this patent:

UNITED STATES PATENTS

| Number | Name | Date |
| --- | --- | --- |
| 153,846 | Reynolds | Aug. 4, 1874 |
| 1,467,262 | Barker | Sept. 4, 1923 |
| 2,283,403 | Wiggins | May 19, 1942 |
| 2,322,610 | Wilcox | June 22, 1943 |
| 2,366,909 | Johnson | Jan. 9, 1945 |
| 2,385,419 | Matulich | Sept. 25, 1945 |